US011689868B2

(12) United States Patent
Leong et al.

(10) Patent No.: US 11,689,868 B2
(45) Date of Patent: Jun. 27, 2023

(54) MACHINE LEARNING BASED HEARING ASSISTANCE SYSTEM

(71) Applicant: Mun Hoong Leong, Repulse Bay (HK)

(72) Inventors: Mun Hoong Leong, Repulse Bay (HK); An Qiang Henley Leong, Repulse Bay (HK)

(73) Assignee: Mun Hoong Leong, Repulse Bay (HK)

( * ) Notice: Subject to any disclaimer, the term of this patent is extended or adjusted under 35 U.S.C. 154(b) by 68 days.

(21) Appl. No.: 17/239,778

(22) Filed: Apr. 26, 2021

(65) Prior Publication Data

US 2022/0345833 A1    Oct. 27, 2022

(51) Int. Cl.
*H04R 25/00*    (2006.01)
*G06N 20/00*    (2019.01)

(52) U.S. Cl.
CPC ........... *H04R 25/505* (2013.01); *G06N 20/00* (2019.01); *H04R 25/554* (2013.01)

(58) Field of Classification Search
CPC .. H04R 25/505; H04R 25/507; H04R 25/554; H04R 2225/39; H04R 2225/41; H04R 2225/55; H04R 2460/07
See application file for complete search history.

(56) References Cited

U.S. PATENT DOCUMENTS

| | | | | |
|---|---|---|---|---|
| 10,129,664 B2 * | 11/2018 | Fitz | .................. | H04R 29/004 |
| 10,916,245 B2 * | 2/2021 | Kwatra | ................ | G06N 20/00 |
| 11,343,618 B2 * | 5/2022 | Fichtl | ................ | G10L 25/51 |
| 2006/0179018 A1 * | 8/2006 | Messmer | ............... | H04R 25/43 |
| | | | | 706/16 |
| 2015/0215714 A1 | 7/2015 | Shennib | | |
| 2019/0392858 A1 | 12/2019 | Lee | | |
| 2020/0104578 A1 | 4/2020 | Cho et al. | | |
| 2020/0404431 A1 | 12/2020 | Jung et al. | | |
| 2021/0092534 A1 | 3/2021 | Fichtl | | |
| 2021/0160605 A1 | 5/2021 | Igarashi et al. | | |
| 2021/0168521 A1 * | 6/2021 | Goorevich | ......... | A61N 1/36038 |
| 2021/0185465 A1 * | 6/2021 | Bramsløw | ............ | H04R 25/554 |
| 2021/0195343 A1 * | 6/2021 | Aubreville | ........... | H04R 25/505 |

(Continued)

FOREIGN PATENT DOCUMENTS

| | | | | | |
|---|---|---|---|---|---|
| GB | | 2586817 A | * | 3/2021 | ............. H04R 25/50 |
| WO | WO-2021148538 A1 | * | 7/2021 | | |
| WO | WO-2021154822 A1 | * | 8/2021 | | |

OTHER PUBLICATIONS

International Search Report for PCT/CN2022/089300.

*Primary Examiner* — Ryan Robinson
(74) *Attorney, Agent, or Firm* — Renner Kenner Greive Bobak Taylor & Weber

(57) ABSTRACT

A hearing assistance device including: a microphone arranged to receive sound of an environment in which the hearing assistance device is located; a wireless communication device arranged to wirelessly communicate data with an external device; a controller operably connected with the microphone and arranged to process the received sound using sound processing settings that have been determined using a trained machine learning processing model; and a speaker operably connected with the controller and arranged to output the processed sound. The sound processing settings have been determined using the trained machine learning processing model based on a hearing response of a user and one or more properties of the environment.

34 Claims, 10 Drawing Sheets

(56) References Cited

U.S. PATENT DOCUMENTS

| | | |
|---|---|---|
| 2021/0227338 A1* | 7/2021 | Abdallah Abdelrehim Abokela .............. A61B 5/4803 |
| 2022/0007116 A1* | 1/2022 | Lu ......................... H04R 25/70 |
| 2022/0109940 A1* | 4/2022 | Nielsen ................ H04R 25/507 |
| 2022/0279290 A1* | 9/2022 | McKinney ........... H04R 25/505 |

* cited by examiner

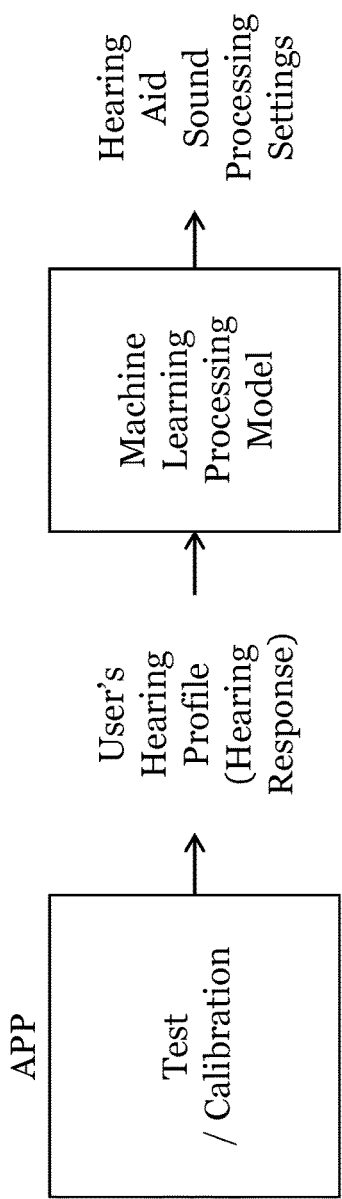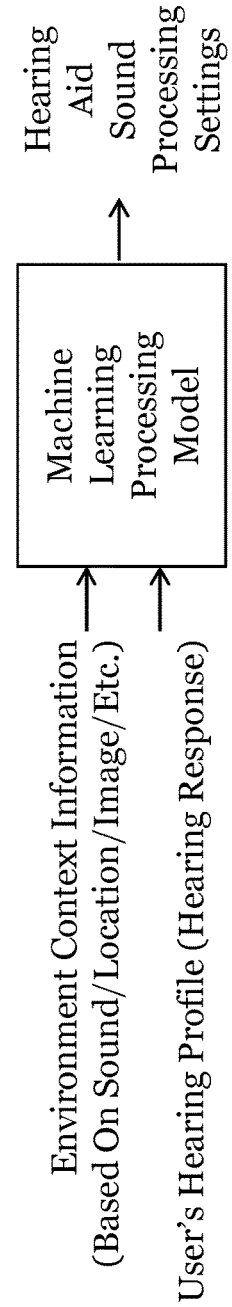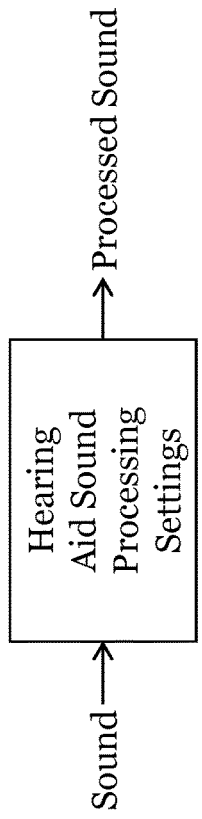
Figure 5
Figure 6
Figure 7

MACHINE LEARNING BASED HEARING ASSISTANCE SYSTEM

TECHNICAL FIELD

The invention relates to a hearing assistance system, and in particular to a hearing assistance system with a hearing assistance device that can adapt the sound processing settings to the environment in which the hearing assistance device is located.

BACKGROUND

Hearing assistance devices (hearing aids) are worn by people with hearing loss to compensate for various degrees of hearing impairments and to facilitate hearing of sounds. Traditionally, a hearing assistance device stores a sound processing profile that contains sound processing settings specific to the user of the hearing assistance device. The sound processing settings are obtained during hearing tests conducted in a clinical facility using specialized instruments under the guidance of an audiologist. The sound processing profile is determined based on the hearing response of the user of the hearing assistance device hence is specific to the user. The hearing assistance device uses the settings in the profile to process sound and provides the processed sound to the user. Over time, the profile or settings may become sub-optimal, or insufficient, as the sense of hearing of the user may have changed over time (e.g., degraded). In some instances, the profile or settings optimal for one noise environment may be sub-optimal or insufficient for a different noise environment. As a result, the user will have to visit the audiologist to conduct hearing tests to have the sound processing profile or settings updated. The need to visit the audiologist in order to update or configure the sound processing profile or settings from time to time can be inconvenient, inefficient, and costly.

US2015/0023535A teaches such a hearing aid fitting system that enables dispensing of hearing assistance devices by a non-expert and without requiring specialized instruments or clinical settings. The disclosed hearing aid fitting system includes an audio signal generator, a programmable hearing assistance device, and a programming interface. The audio signal generator can generate a sequence of test audio signals representing multiple sound segments at suprathreshold levels and collectively defining a fitting soundscape within an audible range of human hearing. The programmable hearing assistance device can receive the test audio signals and programming signals, and can deliver audible output to the user. The audible output is representative of the test audio signals according to fitting parameters (e.g., sound processing parameters) programmed into the programmable hearing device. The programming interface is configured to deliver programming signals to the programmable hearing device in-situ. The programming interface is configured to set the fitting parameters of the programmable hearing device based on a user's perceptual assessment of the audible output (e.g., in different environmental sound profile situations). The hearing assistance device in US2015/0023535A enables relatively simple configuration of the sound processing profile or settings as needed by the user (who is typically a non-expert).

The above-mentioned hearing assistance devices use the same sound processing profile or settings of the same user for processing sounds in different environments in which the hearing assistance device is located. This may be sub-optimal in some applications.

SUMMARY OF THE INVENTION

In a first aspect, there is provided a hearing assistance device. The hearing assistance device comprising: a microphone arranged to receive sound of an environment in which the hearing assistance device is located; a wireless communication device arranged to wirelessly communicate data with an external device; a controller operably connected with the microphone and arranged to process the received sound using sound processing settings that have been determined using a trained machine learning processing model; and a speaker operably connected with the controller and arranged to output the processed sound. The sound processing settings have been determined using the trained machine learning processing model based on a hearing response of a use and one or more properties of the environment. The sound processing settings may have been determined using the trained machine learning processing model based on additional factor(s). The sound may include ambient noise, speech, etc.

Optionally, the one or more properties of the environment comprises: sound profile or ambient noise profile of the environment received by the microphone.

Optionally, the hearing assistance device further comprises a memory storing the sound processing settings.

Optionally, the hearing assistance device further comprises a location determination device arranged to determine a location of the environment in which the hearing assistance device is located. The location determination device may include one or more of: a Global Positioning System (GPS) unit, a Wi-Fi module, a cellular network module, etc.

Optionally, the one or more properties of the environment comprises: the determined location of the environment.

Optionally, the hearing assistance device further comprises a camera arranged to capture an image of the environment; and the controller is arranged to process the image to determine one or more properties of the environment for use in determining the sound processing settings. For example, the image may indicate that the environment is crowded, and the controller is arranged to process the image to determine that the environment is crowded to appropriately adjust sound processing settings.

Optionally, the sound processing settings are determined at the external device and the external device includes the trained machine learning processing model. The external device may be a server, such as a cloud computing server, or a computing device, such as a mobile computing device (smart phone, watch, wristband, tablet, laptop, glasses, etc.).

Optionally the hearing assistance device has sufficient computing power (e.g., via edge computing technologies) to perform the processing operations of the external device. In other words, optionally, the sound processing settings are determined at the hearing assistance device and the hearing assistance device includes the trained machine learning processing model.

Optionally, the hearing assistance device further comprises a memory storing the trained machine learning processing model, and the sound processing settings are determined at the controller.

Optionally, the wireless communication device comprises at least one of: a Bluetooth communication module, a 2G, 3G, 4G, 5G, or higher-order G cellular communication module, and a LTE-M/NB-IoT communication module. Other wireless communication device such as near field communication module, ZigBee communication module, etc. may additionally or alternatively be used.

Optionally, the hearing assistance device comprises input device arranged to receive user input associated with adjustment of sound processing settings of the environment. The input device may include input buttons, actuators, touchscreen, etc. In another embodiment of the first aspect, the input device arranged to receive the user input is arranged on an/the external device.

Optionally, the microphone comprises a multi-directional microphone or an omnidirectional microphone.

Optionally, the sound processing settings are determined or updated dynamically based on (e.g., in response to) change in the one or more properties of the environment.

Optionally, the trained machine learning processing model includes an artificial neural network. The artificial neural network may include a deep neural network. Other machine learning based models, recurrent models or non-recurrent models, can be used if appropriate. These may include, e.g., recurrent neural network, long-short term memory model, Markov process, reinforcement learning, gated recurrent unit model, deep neural network, convolutional neural network, support vector machines, principle component analysis, logistic regression, decision trees/forest, ensemble method (combining model), regression (Bayesian/polynomial/regression), stochastic gradient descent, linear discriminant analysis, nearest neighbor classification or regression, naive Bayes, etc.

Optionally, the hearing assistance device includes one or more than one (e.g., two—left and right) microphones operably connected with the controller; and/or one or more than one (e.g., two—left and right) speakers operably connected with the controller.

In a second aspect, there is provided a device for facilitating operation of a hearing assistance device. The device include a controller arranged to: receive data associated with a hearing response of a user, one or more properties of an environment in which the hearing assistance device is located, and a user input associated with adjustment of sound processing settings of the environment; and train a machine learning training model using the received data to obtain a trained machine learning training model, the trained machine learning training model being arranged to determine sound processing settings for use in the hearing assistance device. Data associated with a hearing response of a user, and one or more properties of an environment in which the hearing assistance device is located may be obtained from the hearing assistance device. User input associated with adjustment of sound processing settings of the environment may be obtained from the hearing assistance device or a computing device (e.g., mobile computing device) operably connected with the hearing assistance device. Preferably, the machine learning training model has been trained using data from multiple users.

Optionally, the controller is arranged to: receive data associated with multiple users and their respective hearing assistance device. The data includes a hearing response of the respective user, one or more properties of the environment in which the respective hearing assistance device is located, and respective user input associated with adjustment of the sound processing settings of the environment. The controller is further arranged to train the machine learning training model using the received data from the multiple users.

Optionally, the one or more properties of the environment in which the hearing assistance device is located comprises one or more of: sound (e.g., speech) or ambient noise of the environment; location of the environment; and a characteristic in an image of the environment.

Optionally, the controller is further arranged to: process a hearing response of a user using the trained machine learning training model so as to determine sound processing settings for use by the hearing assistance device.

Optionally, the controller is further arranged to: process a hearing response of a user and one or more properties of environment in which a hearing assistance device is located using the trained machine learning training model so as to determine sound processing settings for use by the hearing assistance device at the environment.

The device for facilitating operation of the hearing assistance device may be provided by a server operably connected with the hearing assistance device, by the hearing assistance device, or at least partly by a server operably connected with the hearing assistance device and at least partly by the hearing assistance device itself.

In a third aspect, there is provided a method for facilitating operation of a hearing assistance device. The method comprises receiving, at a server, data associated with a hearing response of a user, one or more properties of an environment in which the hearing assistance device is located, and a user input associated with adjustment of sound processing settings of the environment; and training, at the server, a machine learning training model using the received data to obtain a trained machine learning training model.

Optionally, the server is a cloud computing server.

Optionally, the receiving comprises receiving, at the server, data associated with multiple users and their respective hearing assistance device, the data including a hearing response of the respective user, one or more properties of an environment in which the respective hearing assistance device is located, and a respective user input associated with adjustment of the sound processing settings of the environment; and the training includes training, at the server, the machine learning training model using the received data.

Optionally, the method further comprises: receiving the user input at a computing device, and transmitting the user input from the computing device to the server.

Optionally, the method further comprises: detecting the one or more properties of the environment at the hearing assistance device; and transmitting the one or more properties of the environment from the hearing assistance device to the server.

Optionally, the method further comprises: processing, at the server, a hearing response of a user using the trained machine learning training model so as to determine sound processing settings for the hearing assistance device.

Optionally, the method further comprises: transmitting the determined sound processing settings to the hearing assistance device so that the hearing assistance device can process sound using the determined sound processing settings.

Optionally, the method further comprises: processing, at the server, a hearing response of a user and one or more properties of environment in which a hearing assistance device is located using the trained machine learning training model so as to determine sound processing settings for use by the hearing assistance device at the environment.

Optionally, the method further comprises: transmitting the determined sound processing settings to the hearing assistance device so that the hearing assistance device can process sound using the determined sound processing settings.

Optionally, the server may be the device (for facilitating operation of a hearing assistance device) of the second aspect.

In a fourth aspect, there is provided a method for operating a hearing assistance device. The method comprises: receiving, at the hearing assistance device, sound of an environment in which the hearing assistance device is located; processing, at the hearing assistance device, the received sound using sound processing settings that have been determined using a trained machine learning processing model; and outputting, from the hearing assistance device, the processed sound. The sound processing settings have been determined using the trained machine learning processing model based on a hearing response of a user and one or more properties of the environment.

Optionally, the method includes receiving new sound processing settings in response to a change in one or more properties of the environment in which the hearing assistance device is located.

Optionally, the hearing assistance device may be the hearing assistance device of the first aspect.

Unless context requires otherwise, "hearing assistance device" refers to hearing aid, i.e., electronic device that serves a medical purpose to assist the hearing impaired, and does not refer to other types of electronic device that can play sound and serves little or no medical purpose (e.g., headphones, earbuds, personal sound amplification products).

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which:

FIG. 5 is a schematic diagram illustrating a method for setting up or calibrating a hearing assistance device in one embodiment of the invention;

FIG. 6 is a schematic diagram illustrating a method for determining sound processing settings of a hearing assistance device in one embodiment of the invention;

FIG. 7 is a schematic diagram illustrating a method for processing sound using sound processing settings in one embodiment of the invention;

DETAILED DESCRIPTION

Figure 1:
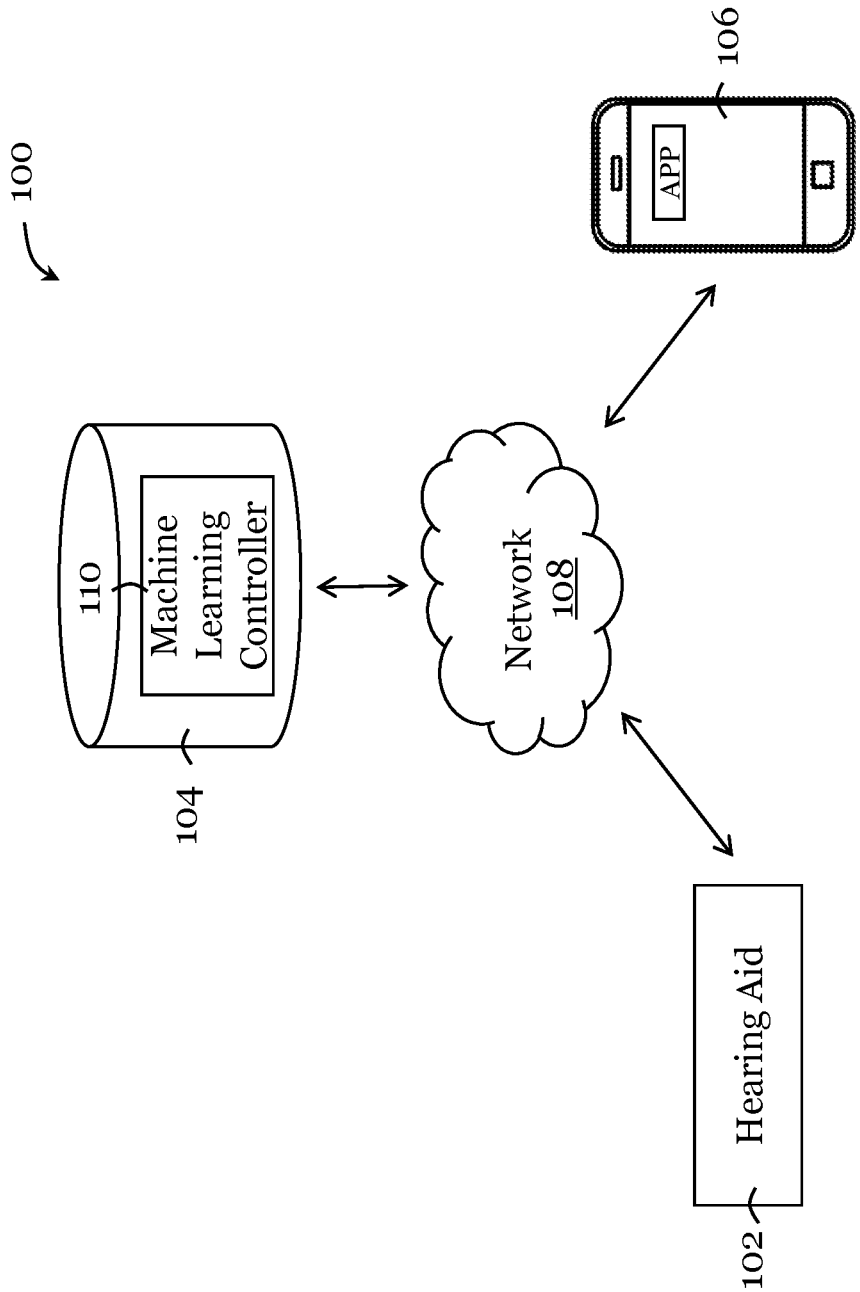
FIG. 1 is a schematic diagram of a hearing assistance system in one embodiment of the invention.

FIG. 1 shows a hearing assistance system 100 in one embodiment of the invention. The hearing assistance system 100 includes a hearing aid 102, a server 104, and a computing device 106 operably connected via a communication network 108.

The hearing aid 102 is arranged to process sound and to provide processed sound to a hearing-impaired user to assist with perception of sound (e.g., speech, noise, etc.) of the user. The sound of an environment may be collected by the hearing aid 102 in the environment in real time and processed by the hearing aid 102 based on determined sound processing profile/settings in real time to provide processed (e.g., enhanced or suppressed for respective audible frequency ranges) sound to the user of the hearing aid 102. Since different users may have different extent of hearing impairment, hence different hearing responses or sound perception in different frequency bands, the sound processing profile/settings provided by the hearing aid 102 is specific to its user. In this embodiment the hearing aid 102 is also arranged to detect one or more properties of the environment in which the hearing aid 102 is located to affect the sound processing settings automatically (e.g., without user intervention). The hearing aid 102 can provide data associated hearing responses of the user and the one or more properties of the environment to the server 104 via the communication network 108 (directly, or indirectly via the computing device 106).

In this example, the computing device 106 is a mobile computing device in the form of a mobile phone. The mobile phone 106 is installed with an application that communicate with the hearing aid 102 to control settings (including but not limited to sound processing settings) of the hearing aid 102, or to provide data to and/or obtain data from the hearing aid 102. The application installed in the mobile phone 106 is arranged to enable self-calibration or fitting of the hearing aid 102 by the user as needed. In one example, the application is arranged to provide a user interface that allows the user to interact with the hearing aid 102. Through the application the mobile phone may provide test audio signals to the hearing aid 102 via the network 108 and receive corresponding feedback from the user during the calibration or fitting so as to determine suitable sound processing profile/settings for the user. As such the calibration or fitting of the hearing aid 102 can be performed by the user himself/herself. Through the application, the mobile phone may receiver user input to adjust settings (e.g., sound processing settings) of the hearing aid 102 during normal use of the hearing aid, and provide corresponding command to the hearing aid 102 to implement the user's adjustment. The mobile phone 106 is arranged to provide the user input or adjustment received to the server 104 via the communication network 108.

The server 104 is arranged remote from the hearing aid 102 and the computing device 106. The server 104 includes, among other components, a machine learning controller 110. The machine learning controller 110 is arranged to process data received from the hearing aid 102 and the computing device 106 using machine learning processing model(s) to determine sound processing profile/settings for use in the hearing aid 102. The server 104 can then provide via the network 108 the determined sound processing profile/settings to the hearing aid 102 such that the hearing aid 102 can use the machine-learning-based-determined sound processing profile/settings for processing sound in particular hearing aid 102 and/or environment. The machine learning processing model(s) can be trained by the server 104 based on data received from the hearing aid 102 and the computing device 106, including the hearing response to the user, one or more properties of the environment in which the associated hearing aid 102 is arranged, and corresponding user input or adjustment associated with the sound processing settings of the associated hearing aid 102 in the environment, as will be described in more detail below. By training the machine learning processing model(s) based on these data, the machine learning processing model(s) may become more accurate or effective in determining suitable sound processing profile/settings for use in different hearing aids for different users in different environment. The server 104 may store the various data obtained as well as predetermined test/standard training data. The server 104 may use the various data obtained as training data. In this example, the server 104 may be a cloud-based server.

The communication network 108 may provide one or more wired e.g., (cable, USB, etc.) and/or wireless (e.g., Bluetooth®, Wi-Fi, near field communication, cellular communication, ZigBee, RFID, IoT-based, etc.), direct and/or indirect, communication links between one or more of: the hearing aid 102 and the server 104, the server 104 and the computing device 106, and the hearing aid 102 and the computing device 106. In one example, the hearing aid 102 is arranged to communicate with the server 104 directly via LTE-M communication link and/or a NB-IoT communication link. In another example, the hearing aid 102 is arranged to communicate with the server 104 indirectly through the computing device 106 (via a Bluetooth® communication link between the hearing aid 102 and the computing device 106 then via another communication link between the computing device 106 and the server 104). In one example, the computing device 106 is arranged to communicate with the server 104 directly via a cellular network communication link.

Figure 2:
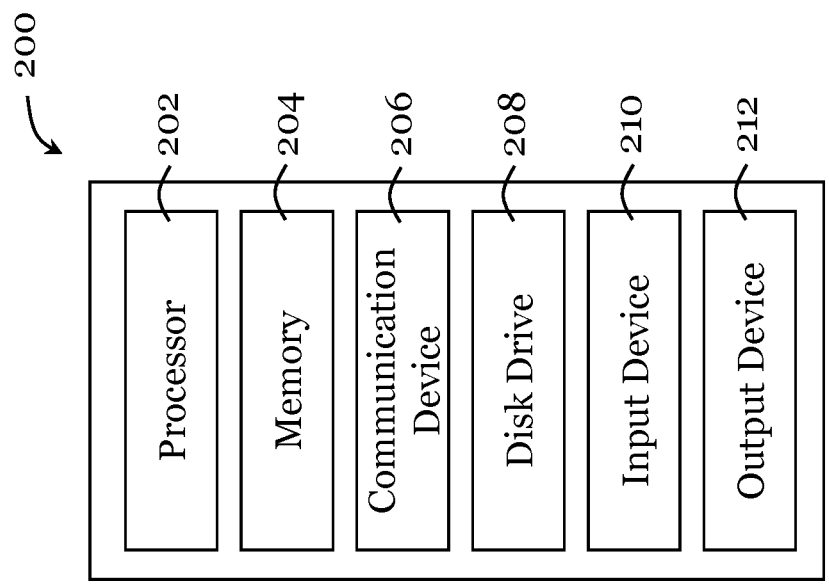
FIG. 2 is a functional block diagram of an information handling system in one embodiment of the invention.

FIG. 2 shows an information handling system 200 that can be used as a hearing aid (such as hearing aid 102 in the hearing assistance system 100 of FIG. 1), a server (such as server 104 in the hearing assistance system 100 of FIG. 1), a computing device (such as computing device 106 in the hearing assistance system 100 of FIG. 1), or another type of information processing device or system in one embodiment of the invention. The information handling system 200 can be portable, wearable, etc. The information handling system 200 generally comprises suitable hardware and/or software components necessary to receive, store, and execute appropriate computer instructions, commands, or codes. The main components of the information handling system 200 are processor 202 and memory (storage) 204. The processor 202 may be formed by one or more of: CPU, MCU, controllers, logic circuits, Raspberry Pi chip, digital signal processor (DSP), application-specific integrated circuit (ASIC), Field-Programmable Gate Array (FPGA), or any other digital or analog circuitry configured to interpret and/or to execute program instructions and/or to process signals and/or information and/or data. The memory 204 may include one or more volatile memory (such as RAM, DRAM, SRAM), one or more non-volatile memory (such as ROM, PROM, EPROM, EEPROM, FRAM, MRAM, FLASH, SSD, NAND, and NVDIMM), or any of their combinations. Appropriate computer instructions, commands, codes, information and/or data may be stored in the memory 204. One or more applications may be installed in the information handling system 200. Optionally, the information handling system 200 further includes one or more input devices 206 arranged to receive user input. Examples of such input device 206 include one or more of: buttons, actuators, keyboard, mouse, stylus, image scanner (e.g., identifier (barcode, QR code, etc.) scanner), microphone, tactile/touch input device (e.g., touch sensitive screen), image or video input device (e.g., camera), biometric data input device (e.g., fingerprint detector, facial detector, etc.), etc. Optionally, the information handling system 200 further includes one or more output devices 208. Examples of such output device 208 include one or more of: display (e.g., monitor, screen, projector, etc.), speaker, disk drive, headphone, earphone, printer, additive manufacturing machine (e.g., 3D printer), etc. The display may include a LCD display, a LED/OLED display, or any other suitable display that may or may not be touch sensitive. The information handling system 200 may further include one or more disk drives 212 which may encompass one or more of: solid state drive, hard disk drive, optical drive, flash drive, magnetic tape drive, etc. A suitable operating system may be installed in the information handling system 200, e.g., on the disk drive 212 or in the memory 204. The memory 204 and the disk drive 212 may be operated by the processor 202. Optionally, the information handling system 200 also includes a communication device 210 for establishing one or more communication links (not shown) with one or more other computing devices such as servers, computing devices, personal computers, terminals, tablets, phones, watches, IoT devices, hearing aids, or other wireless or handheld computing devices. The communication device 210 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, an optical port, an infrared port, a USB connection, a LTE-M communication module, a NB-IoT communication module, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 202, the memory 204, and optionally the input device(s) 206, the output device(s) 208, the communication device 210 and the disk drives 212 are connected with each other through a bus, a Peripheral Component Interconnect (PCI) such as PCI Express, a Universal Serial Bus (USB), an optical bus, or other bus structure. In one embodiment, some of these components may be connected through a network such as the Internet or a cloud computing network. The information handling system 200 may also include a location determination module such as a GPS unit, a Wi-Fi module, a cellular network module, etc. It should be appreciated that the information handling system 200 shown in FIG. 2 is merely exemplary and that the information handling system 200 can, in other embodiments, have different configurations (e.g., additional components, fewer components, etc.).

Figure 3:
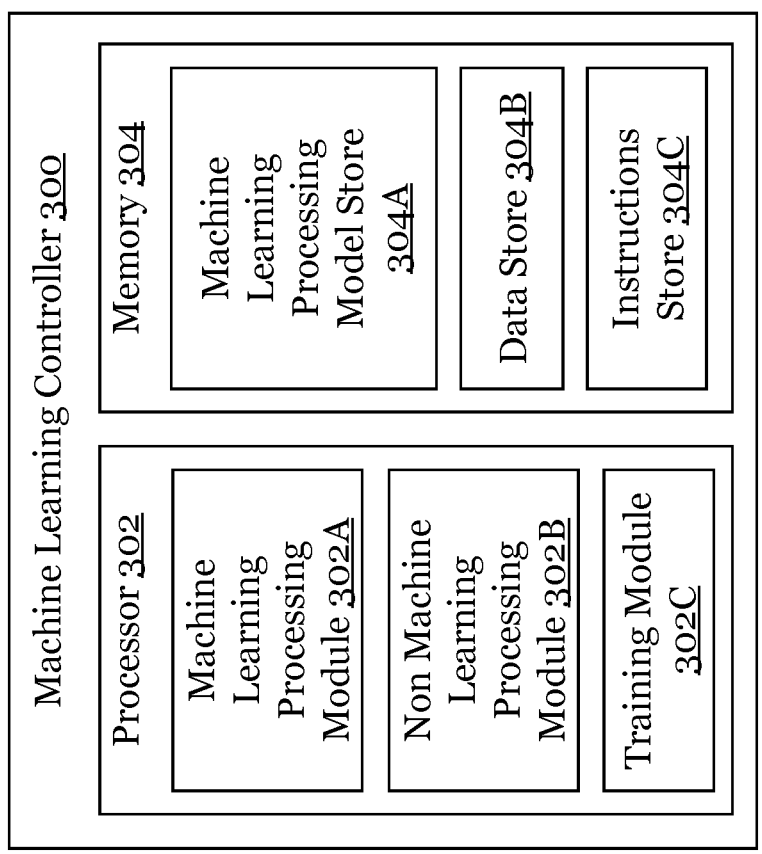
FIG. 3 is a functional block diagram of a machine learning controller in one embodiment of the invention.

FIG. 3 shows a machine learning controller 300 in one embodiment of the invention. The machine learning controller 300 can be used, e.g., as the machine learning controller 110 in the server 104 of the hearing assistance system 100 of FIG. 1. The following description describes an example of how the machine learning controller 300 can operate in the hearing assistance system 100 of FIG. 1. It should be noted that the machine learning controller 300 can be used in other hearing assistance systems, or can be used additionally or alternatively in other device(s) in the hearing assistance system 100 of FIG. 1.

The machine learning controller 300 includes a processor 302 and a memory 304. The processor 302 may be formed by one or more of: CPU, MCU, controllers, logic circuits, Raspberry Pi chip, digital signal processor (DSP), application-specific integrated circuit (ASIC), Field-Programmable Gate Array (FPGA), or any other digital or analog circuitry configured to interpret and/or to execute program instructions and/or to process information and/or data. The memory 304 may include one or more volatile memory unit (such as RAM, DRAM, SRAM), one or more non-volatile memory unit (such as ROM, PROM, EPROM, EEPROM, FRAM, MRAM, FLASH, SSD, NAND, and NVDIMM), or any of their combinations.

The processor 302 includes a machine learning processing module 302A and a non machine learning processing module 302B. The machine learning processing module 302A is arranged to process data using one or more machine learning processing models. In this embodiment, the machine learning processing model may determine a sound processing profile (with a set of sound processing settings) for use in the hearing aid 102 based on data associated with a hearing response of a user of the hearing aid 102 (e.g., different hearing responses in different frequency bands) and one or more properties of the environment in which the hearing aid 102 is located (e.g., location of the environment, sound profile or ambient noise profile of the environment, properties of the environment determined from an image (or a stream of images or a video)). The data associated with a hearing response of the user may have incorporated a user adjustment, i.e., the data associated with the hearing response has been adjusted by the user. The data associated with a hearing response of the user and one or more properties of the environment may be received from the hearing aid 102 and/or the mobile phone 106 or may be stored in the memory 304. The non machine learning processing module 302B is arranged to process data without using machine learning processing models or methods. For example, the non machine learning processing module 302B may be used to perform various signal or hearing response data processing such as filtering, segmenting, thresholding, averaging, smoothing, padding, transforming, scaling, etc. The non machine learning processing module 302B may process an image of the environment and determine one or more properties in the environment (e.g., crowdedness, listening intent, etc.). Additionally or alternatively, the non machine learning processing module 302B may process a sound signal to determine one or more of its properties or component (e.g., noise, speech, etc.). Processing of data received from the hearing aid 102 and/or the mobile phone 106 may involve the use of only machine learning processing, only non machine learning processing, or both. The processor 302 also includes a training module 302C arranged to train the machine learning processing model(s) used to determine the sound processing profile/settings, such as the model(s) in the memory 304.

The memory 304 includes a machine learning processing model store 304A arranged to store one or more machine learning processing models to be used by the processor 302 for processing data. The one or more machine learning processing models may be used to determine a sound processing profile (with a set of sound processing settings) for use in different hearing aids. In one example, only one machine learning processing model is stored. In another example, multiple machine learning processing models are stored. The machine learning processing models may each correspond to a respective type, brand, and/or model of hearing aids, i.e., be used to determine sound processing response of a particular type, brand, and/or model of hearing aid. The machine learning processing model(s) in the machine learning processing model store 304A may be trained, re-trained, or updated as needed—new or modified machine learning processing model(s) may be obtained by training or by data transfer (loading into the machine learning controller 300). The memory 304 also includes data store 304B and instructions store 304C. The data store 304B may store: training/validation/test data for training/validating/testing the machine learning processing model(s), data received from external devices such as the hearing aid 102 and/or the mobile phone 106 (including data associated with data associated with hearing responses of the users, properties of different environment, and user input associated with adjustment of sound processing settings), etc. The training/validation/test data used to train/validate/test the respective machine learning processing model(s) may be classified based on type, brand, and/or model of the hearing aid, for use in the training/validating/testing different machine learning processing models. The instructions store 304C stores instructions, commands, codes, etc., that can be used by the processor 302 to operate the machine learning controller 300.

The machine learning controller 300, with the training module 302C, can initialize, construct, train, and/or operate the one or more machine learning processing models (e.g., algorithms) in machine learning processing model store 304A. In this embodiment, the machine learning processing model(s) can be initialized, constructed, trained, and/or operated based on supervised learning. The machine learning controller 300 can be presented with example input-output pairs, e.g., formed by example inputs (hearing response of user and one or more properties of environment) and their actual outputs (sound processing settings that are determined to suit the corresponding hearing response and environment), which may be stored in memory 304, to learn a rule or model that maps the inputs to the outputs based on the provided example input-output pairs. Different machine learning processing models may be trained differently, using different machine learning methods, input and output data, etc., to suit specific task or application. For example, the training examples/data used to train the machine learning processing models may include different information and may have different dimensions based on the task to be performed by the machine learning processing models. The machine learning controller 300 may perform machine learning using various machine learning methods. For example, the machine learning controller 300 may implement the machine learning program using different machine learning based models, recurrent models or non-recurrent models. These may include, e.g., recurrent neural network, long-short term memory model, Markov process, reinforcement learning, gated recurrent unit model, deep neural network, convolutional neural network, support vector machines, principle component analysis, logistic regression, decision trees/forest, ensemble method (combining model), regression (Bayesian/polynomial/regression), stochastic gradient descent, linear discriminant analysis, nearest neighbor classification or regression, naive Bayes, etc. Each machine learning processing model can be trained to perform a particular processing or classification task. The machine learning processing model can be trained to identify, based on input data (data associated with hearing response of the user of the hearing aid and one or more properties of environment in which the hearing aid is located), an estimated sound processing profile and/or associated sound processing settings for use in processing sound by that device at that environment.

As mentioned, training examples are provided to the machine learning controller 300, which then uses them to generate or train a model (e.g., a rule, a set of equations, and the like), i.e., a machine learning processing model that helps categorize or estimate an output based on new input data. The machine learning controller 300 may weigh different training examples differently to, for example, prioritize different conditions or outputs. In one embodiment, the user input associated with adjustment of sound processing settings relates to user input on the sound processing performed by the corresponding hearing aid. The user input may take different forms and may be received at the hearing aid 102 or at the mobile phone 106. In one example, if the hearing aid 102 located in a particular environment produces a processed sound that the user finds to be satisfactory (considered properly sounded), the hearing response of the user and/or the one or more properties of the environment in which the hearing aid is located, and the resulting sound processing settings, can be used (e.g., given more weight) as input-output pairs in the training of the machine learning processing model. If the hearing aid 102 located in the particular environment produces a processed sound that the user finds to be unsatisfactory (considered not properly sounded, cannot hear, etc.), the user can make changes to existing sound processing settings. The changes made by the user may be changes to sound processing in particular frequency band(s). In such case, the hearing response of the user and/or the one or more properties of the environment in which the hearing aid is located, and the user-updated sound processing settings, may then be used as input-output pairs in the training of the machine learning processing model. Or, if the hearing aid 102 located in the particular environment produces a processed sound that the user finds to be unsatisfactory (considered not properly sounded, cannot hear, etc.), the user can make provide a feedback to indicate that sound processing performed is not optimal, in which case the hearing response of the user and the one or more properties of the environment in which the hearing aid is located, and the existing sound processing settings, can be disregarded or given less weight as input-output pairs in the training of the machine learning processing model. The training module 302C may train the model(s) in real time (whenever user input is received), at regular intervals, or after accumulating a sufficient amount of user inputs.

In this embodiment, the machine learning processing model includes an artificial neural network. The artificial neural network includes an input layer multiple hidden layers or nodes, and an output layer, operably connected with one another. The number of inputs may vary based on the particular task. Accordingly, the input layer of the artificial neural network of the machine learning controller 300 (or of different processing models) may have a different number of nodes based on the particular task for the machine learning controller 300. The number of hidden layers varies and may depend on the particular task for the machine learning processing model. Each hidden layer may have a different number of nodes and may be connected to the adjacent layer in a different manner. For example, each node of the input layer may be connected to each node of the first hidden layer, and the connections may each be assigned a respective weight parameter. In one example, each node of the neural network may also be assigned a bias value. The nodes of the first hidden layer may not be connected to each node of the second hidden layer, and again, the connections are each assigned a respective weight parameter. Each node of the hidden layer may be associated with an activation function that defines how the hidden layer is to process the input received from the input layer or from a previous hidden layer (upstream). These activation functions may vary. Each hidden layer may perform a different function. For example, some hidden layers can be convolutional hidden layers for reducing the dimensionality of the inputs, while other hidden layers can perform more statistical functions such as averaging, max pooling, etc. The last hidden layer is connected to the output layer, which usually has the same number of nodes as possible outputs. During training, the artificial neural network receives the inputs for a training example and generates an output using the bias for each node, and the connections between each node and the corresponding weights. The artificial neural network then compares the generated output with the actual output of the training example. Based on the generated output and the actual output of the training example, the neural network changes the weights associated with each node connection. In some embodiments, the neural network also changes the weights associated with each node during training. The training continues until, for example, a predetermined number of training examples being used, an accuracy threshold being reached during training and validation, a predetermined number of validation iterations being completed, etc. Different types of training algorithms, such as those listed above, can be used to adjust the bias values and the weights of the node connections based on the training examples.

Figure 4:
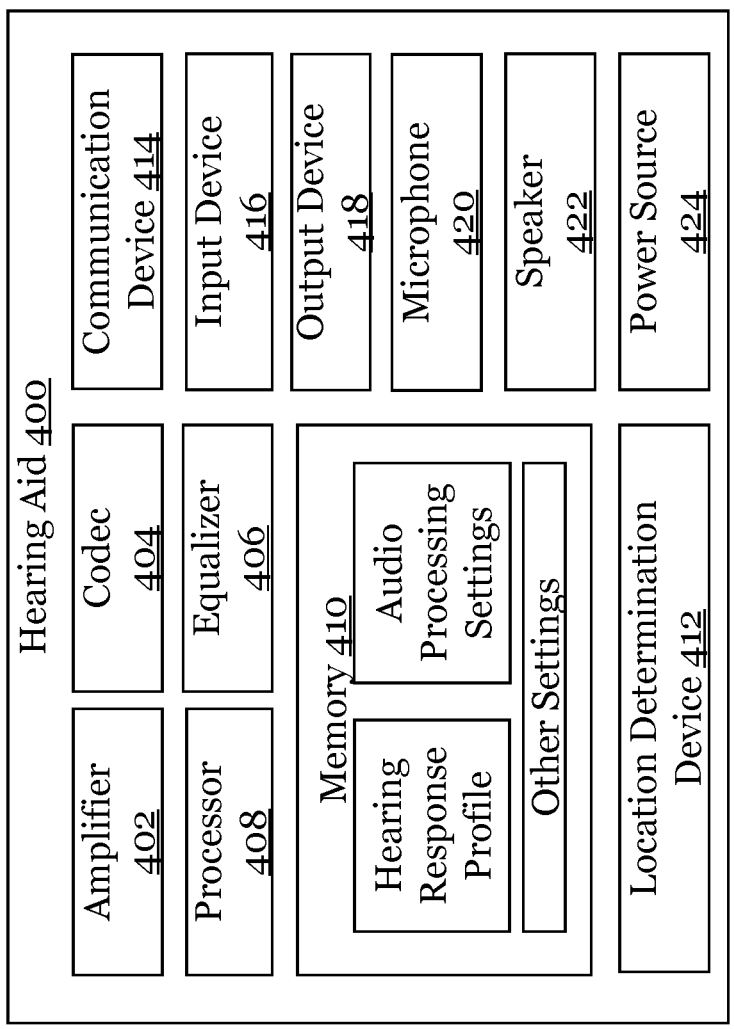
FIG. 4 is a functional block diagram of a hearing assistance device in one embodiment of the invention.

FIG. 4 shows a hearing assistance device 400 in one embodiment of the invention. The hearing assistance device 400 can be used as the hearing aid 102 of FIG. 1. The hearing assistance device 400 includes a microphone 420 and a speaker 422. The microphone 420 is arranged to collect sound (e.g., noise, speech, etc.) in the environment in which the device 400 is located. The speaker 422 is arranged to provide processed sound to the user of the device 400. The microphone 420 and speaker 422 are operably connected with, among other things, an audio amplifier 402, an audio codec unit 404, an equalizer 406, a processor 408, and a memory 410. The audio amplifier 402 is arranged to amplify a processed sound signal (e.g., received from the audio codec unit 404) in analog form and provide the amplified analog sound signal to the speaker 422. The audio codec unit 404 is arranged to perform analog-to-digital and digital-to-analog conversions to the sound signals. In this example, the audio codec unit 404 is arranged to digitize the analog sound signal received from the microphone 420, and to convert the processed sound signal to be provided to the amplifier 430 and subsequently to the speaker 422 into analog output signals. The equalizer 406 may be a multi-band equalizer. The construction of the processor 408 and memory 410 may be the same or similar to the construction of the processor 202 and memory 204 described with respect to FIG. 2. The equalizer 406 and the processor 408 (may be integrated) may cooperate to process sound signals based on a sound processing profile (settings) stored in memory 410 so as to provide a processed sound signal. The sound processing profile/settings may be specific to the user (or the hearing response of the user) as well as the operation environment in which the device 400 is located. As a result, the processed sound signal may be particularly suited for the user using the device 400 in that environment. In one example, if the user is less sensitive towards low frequency sound in a particular environment or in the environment with particular properties, the sound processing profile/settings may be arranged to process the sound signal to boost the low frequency sounds so as to facilitate perception of such sounds by the user in that particular environment. The sound processing profile/settings stored in the memory 410 are determined using a trained machine learning processing model (such as one described above) based on: a hearing response of a user and one or more properties of the environment. The sound processing profile/settings may be changed by the user via user input received at the device 400 or received at an external device (e.g., a computing device 106). The memory 410 stores sound processing settings (profile) that can be used to process sound signals, hearing response of the user, various settings (e.g., power settings, location settings, operation mode settings) of device 400, and data (e.g., user input associated with adjustment of sound processing settings). The memory 410 may store multiple sound processing profiles each with different sound processing settings.

The hearing assistance device 400 also includes a location determination device 412 arranged to determine, in real time, a location in which the device 400 is arranged. In this embodiment, the location determination device 412 is a GPS unit. The location, or the location of the environment, can be used by the processor 408 to determine whether a change in sound processing profile/settings is required. For example, if the device 400 determines that its location has changed sufficiently, the device 400 may provide its location information (among other information) to a server (e.g., the server 104) for application in a machine learning processing to determine and obtain new sound processing profile/settings suited for the new location.

The hearing assistance device also includes communication device 414, input device 416, output device 418, and a power source 424. The construction of the communication device 414, input device 416, and output device 418 may be the same or similar to the construction of the communication device 210, input device 206, and output device 208 described with respect to FIG. 2. In one example, the communication device includes a wireless communication device. The wireless communication device includes a Bluetooth communication module, a cellular communication module, or an IoT-based communication module (LTE-M communication module and/or a NB-IoT communication module). The input device 416 may include actuators, buttons, touch-screen, etc., for receiving user input. The input device 416 may include a camera for capturing images of the environment in which the device 400 is located. The output device may include a light indicator (e.g., LED), a/the touch-screen, an audible indicator (e.g., buzzer), etc., for providing alert or information to the user. The power source 424 includes a DC power source, such as a battery, a capacitor arrangement, etc. The battery may be rechargeable. The battery may be hard-wired to the device 400 or it may be removable from the device 400.

In use, the sound collected by the microphone 420 is first transmitted to the audio codec unit 404 for analog to digital conversion. Then, the digital signal is provided to the processor 408 and equalizer 406 for processing based on a sound processing profile/settings (determined based on machine learning processing model) stored in memory 410. The sound processing profile/settings is specific not only to the hearing response of the user but also to the environment. After processing at the processor 408 and equalizer 406, the processed sound signal is provided to the audio codec unit 404 for digital to analog conversion. The converted signal is then provided to the audio amplifier 402, amplified by the audio amplifier 402, and subsequently provided to the speaker 422.

Upon turning on the device 400 in an environment, the location determination device 412 determines the location in which the device 400 is located, or the microphone 420 collects sound of the environment and the processor 408 processes the sound to determine ambient noise or type of sound in the sound, and/or the camera captures an image/video of the environment and the processor 408 processes the image to determine type or characteristics of the environment (e.g., crowded, open area, noisy object present, indoors/outdoors, speech/no speech, etc.), so as to determine one or more properties of the environment. The device 400 then transmits the one or more properties of the environment and the hearing response of the user to the server. The server applies the received information to the machine learning processing model so as to obtain a sound processing profile/settings suited for use by that user or device 400 in that environment. The sound processing profile/settings is provided from the server to the device 400, directly or indirectly (e.g., via the mobile phone). The device 400 receives the sound processing profile/settings via the communication device 414, and stores the sound processing profile/settings in the memory 410 for use by the processor 408 and equalizer 406 to process sound.

If, during operation in the environment, the user feels that the hearing experience is not satisfactory, the user may provide user input via the input device 416 of the device 400 or via the input device on a computing device (e.g., mobile phone) in communication with the device 400. The user input may be an adjustment of the profile/settings, or may be a feedback on the usefulness of the profile/settings. The device 400 is arranged to then use the adjusted profile/settings to process sound signals for the user. Such user input is useful information as it indicates a potential deficiency in the sound processing profile/settings. The device 400 is arranged to store and transmit the user input to the server. The server can use such information in the training of the machine learning processing model in the server so as to further improve the model. The device 400 may provide the user input to the server in real time (whenever there is user input), at regular intervals, or after accumulating a sufficient amount of user inputs.

If, during operation, the device 400 determines that one or more properties of the environment has changed (e.g., the location of the environment has changed, the sound or noise profile of the environment has changed, etc.), the device 400 transmits the one or more properties of the new environment and the hearing response of the user to the server. The server applies the received information to the machine learning processing model so as to obtain a new sound processing profile/settings suited for use by that user or device 400 in the new environment. The sound processing profile/settings is provided from the server to the device 400, directly or indirectly (e.g., via the mobile phone). The device 400 receives the new sound processing profile/settings via the communication device 414, and stores the sound processing profile/settings in the memory 410 for use by the processor 408 and equalizer 406 to process sound, e.g., until the device 400 determines that one or more properties of the new environment has changed.

FIG. 5 illustrates how a hearing assistance device can be calibrated or set-up in one embodiment of the invention. The hearing assistance device may be the hearing aid 102 in the hearing assistance system 100 of FIG. 1, or it may be other hearing assistance devices. A hearing profile of the user of the hearing assistance device can be determined by a test or calibration process. In this example, the test or calibration is provided to the user through an application installed on a mobile phone operably connected with the hearing assistance device. The test or calibration may be conducted by providing sample sounds to the user and receiving user input on the provided sample sounds. After the test or calibration the hearing profile of the user is established. The hearing profile includes a hearing response of the user over an audible frequency range, for one or both ears of the user. In one example, the audible frequency range may be divided into multiple frequency bands, each having a respective response profile (e.g., of minimum audible volume in the band). The determined hearing profile of the user may be applied to a machine learning processing model, such as that described above, to generate a set of sound processing settings that are suitable for processing sounds for user with such hearing profile.

FIG. 6 illustrates the determination of sound processing settings of a hearing assistance device in one embodiment of the invention. The hearing assistance device may be the hearing aid 102 in the hearing assistance system 100 of FIG. 1, or it may be other hearing assistance device for use in other hearing assistance system. A determined hearing profile of the user of the hearing assistance device as well as context information about the environment in which the hearing assistance device is located may be applied to a machine learning processing model, such as that described above, to generate a set of sound processing settings that are suitable for processing sounds for user with such hearing profile and located in such environment. The context information about the environment may include the location of the environment, a sound/ambient noise profile of the environment, and properties of the environment indicated by an image of the environment (e.g., indoors/outdoors, crowded/not crowded, etc.).

FIG. 7 illustrates processing of sound using sound processing settings in one embodiment of the invention. The sound processing settings, such as those obtained in the method of FIG. 5 or the method of FIG. 6, can be used to processed sound. The sound is first detected or collected by a microphone of the hearing assistance device. The detected or collected sound is then processed using the sound processing settings to obtain processed sounds. The processed sounds are provided to the user through a speaker of the hearing assistance device.

Figure 8:
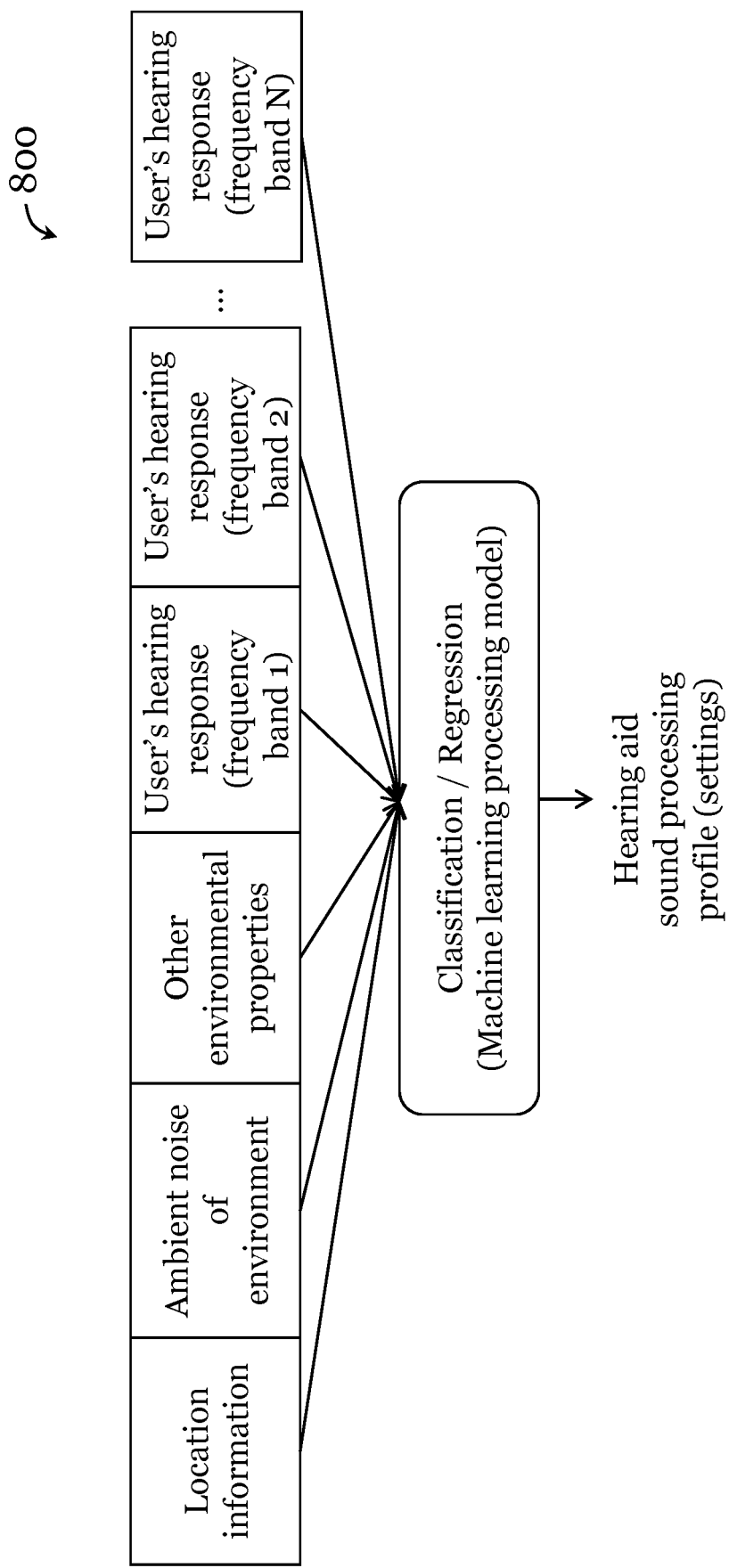
FIG. 8 is a schematic diagram illustrating operation of a machine learning controller in one embodiment of the invention.

FIG. 8 illustrates an exemplary operation of a machine learning controller, such as but not limited to the machine learning controller 300 of FIG. 3, in one embodiment of the invention. For illustration, the following description is provided with reference to the machine learning controller 300. The machine learning controller 300, with a machine learning processing model, is arranged to estimate a sound processing profile (settings) suitable for use by the hearing assistance device for processing sounds in an environment. The machine learning controller is arranged to use some or all of the following as input: location information of the environment, ambient noise of the environment, other properties of the environment, the user's hearing response (for different frequency bands 1, 2, . . . , N). The user's hearing response may be an originally-determined hearing response (determined via test/calibration) or an adjusted hearing response (adjusted based on user input). The machine learning processing model is adapted to perform classification or regression (using different machine learning models as presented above) based on the received one or more input to determine a sound processing profile (settings) for use in the hearing assistance device.

Figure 9:
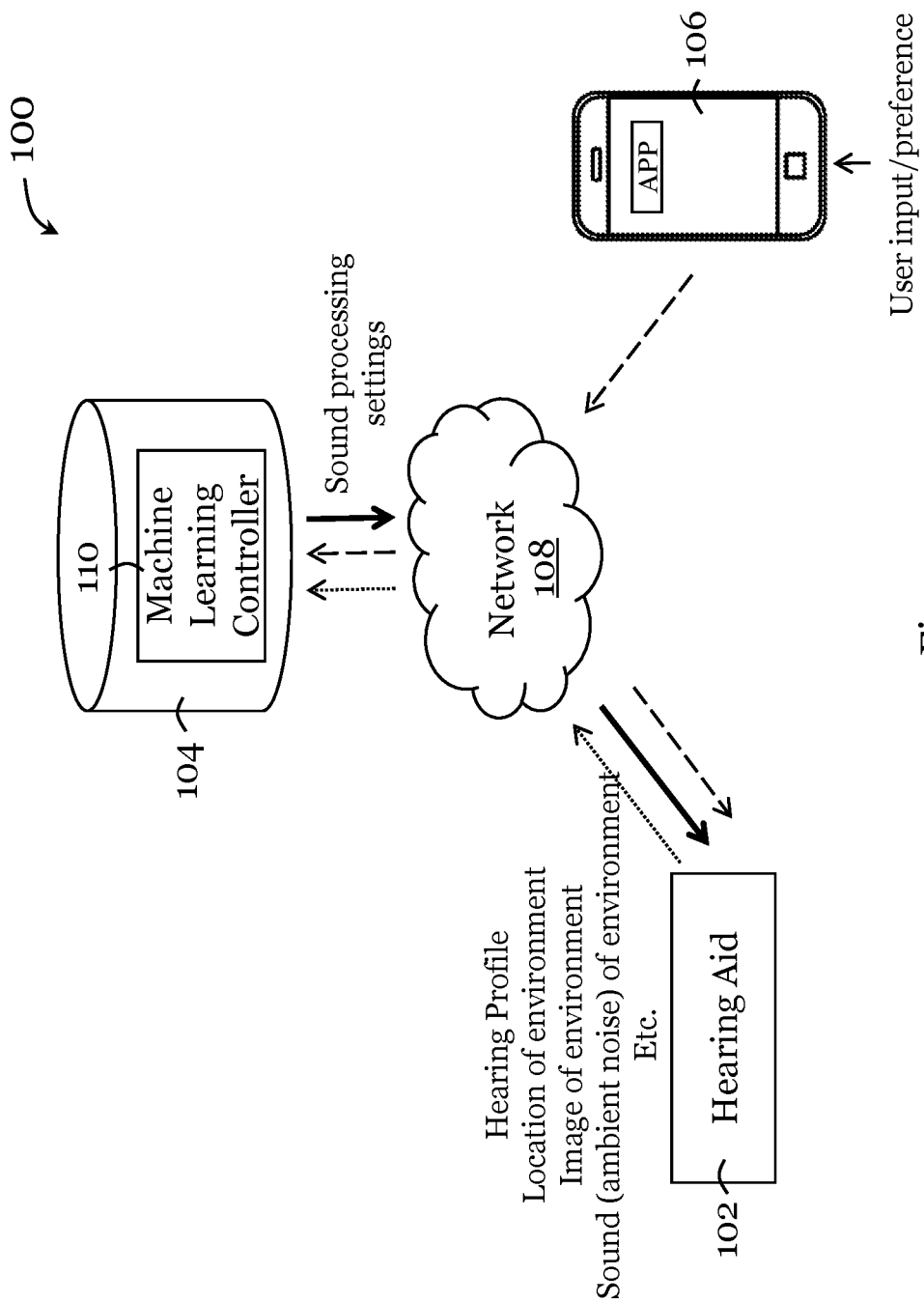
FIG. 9 is a schematic diagram illustrating data flow in the hearing assistance system of FIG. 1 in one embodiment of the invention.

FIG. 9 illustrates exemplary data flow in the hearing assistance system 100 of FIG. 1 in one embodiment of the invention. As explained above, during operation, the hearing aid 102 is arranged to determine one or more properties of the environment in which the hearing aid 102 is located. In this example, the hearing aid 102 determines one or more of: location of the environment, image (hence associated characteristics) of the environment, sound profile or ambient noise profile of the environment, etc. The hearing aid 102 provide this data or information, along with a determined hearing profile of the user, to the server 104 via the network 108. When the hearing aid 102 detects a change in one or more environmental properties, it sends, optionally in real time, the one or more environmental properties along with a determined hearing profile of the user to the server 104 via the network 108. The server 104, and more particularly the machine learning controller 110, processes the information or data using the machine learning processing model to obtain a new sound processing profile/settings. The server 104 then transmits the new sound processing profile/settings back to the hearing aid 102. The hearing aid 102 then uses the new sound processing profile/settings to process sound in the changed environment. Preferably, the change of sound processing profile/settings is in substantially real time (soon after the environment changes) and does not appear abrupt to the user.

When the hearing aid 102 is operating in an environment, and the user is not satisfied with the sound processing function or performance, the user may provide user input through the mobile phone 106. The user input may be associated with adjustment or adjustment need of the sound processing profile/settings in the hearing aid 102 operating in the environment. Upon receiving the user input, the mobile phone 106 sends the user input (adjustment) to the hearing aid 102 via the network 108 to affect the change of the sound processing profile/settings in the hearing aid 102. In addition, the mobile phone 106 sends the user input (adjustment) to the server 104 via the network 108 to affect the subsequent training of the machine learning processing model in the machine learning controller 110 of the server 104. The sending of the user input may be in real time. If the mobile phone 106 sends the user input to the server, the hearing aid 102 also sends, optionally at substantially the same time, the corresponding original sound processing settings, the user's hearing response, and the environmental properties information to the server 104. The machine learning controller 110 of the server 104 then adjusts the training data (used in training the machine learning processing model in the machine learning controller 110) based on the received user input, hearing profile, and environmental properties. The machine learning controller 110 trains the machine learning processing model accordingly using the adjusted training data to affect subsequent generation of sound processing profile (settings).

Figure 10:
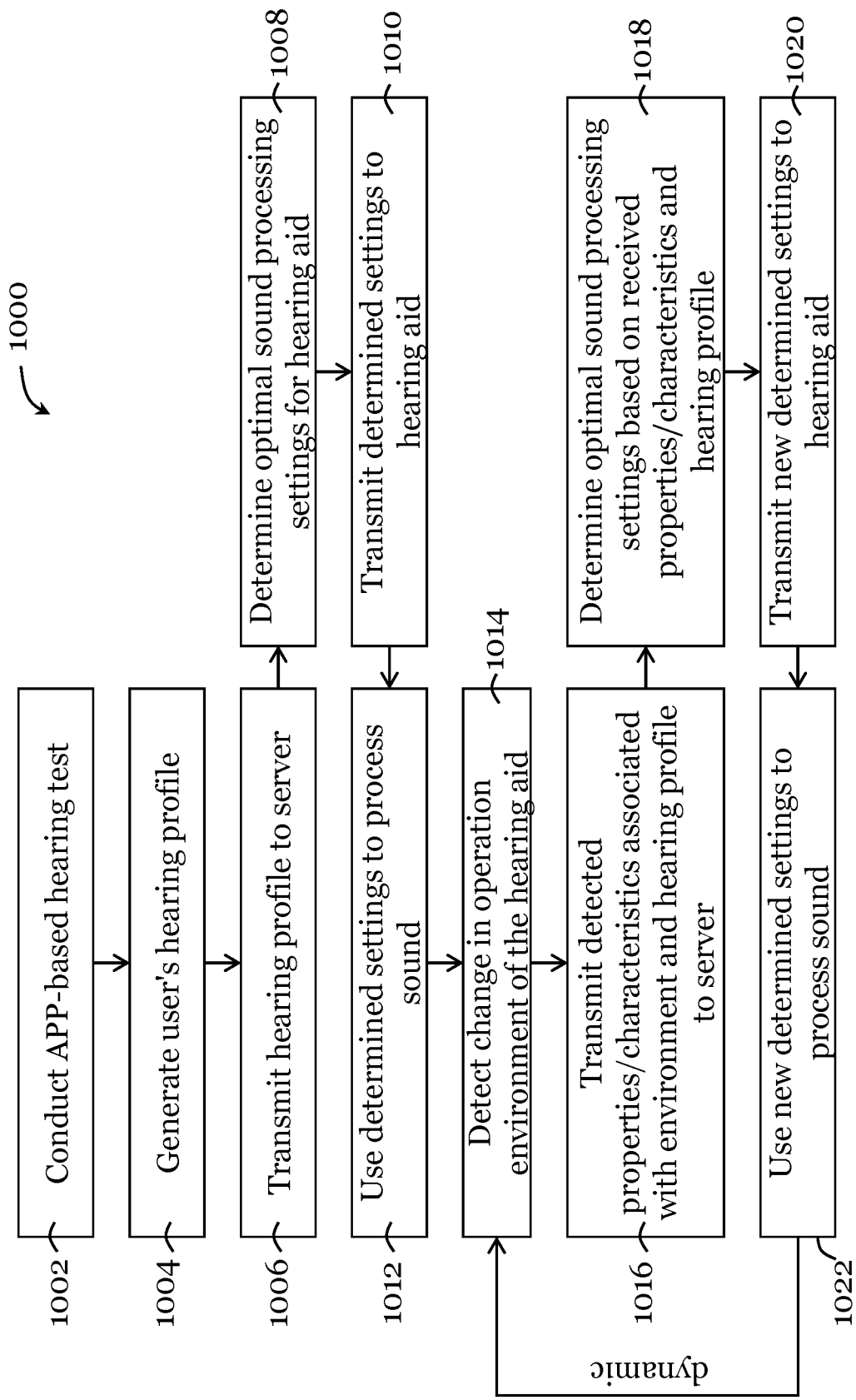
FIG. 10 is a flow diagram of a method for operating a hearing assistance system in one embodiment of the invention.

FIG. 10 shows a method 1000 for operating a hearing assistance system in one embodiment of the invention. The method 1000 may be used, e.g., in the hearing assistance system 100 of FIG. 1. The method 1000 begins in step 1002, in which an application based hearing test is conducted. The application may be installed in a computing device (e.g., mobile phone) operably connected with the hearing aid, and the hearing test is a test for fitting or calibrating the hearing aid in the hearing assistance system, preferably by a non-expert such as a user of the hearing aid. The test may involve providing sample sounds to the user via the hearing aid (e.g., signals of the sample sounds are transmitted from the mobile phone in which the application is stored to the hearing aid), and receiving, at the mobile phone, user feedback associated with the perception of sample sounds. The sample sounds may include sounds of different frequency bands, different sound pressure level, etc. The user feedback may include an indication of whether the sound is audible or an identification of the played sound. After the test is completed, a hearing profile of the user (a hearing response of the user over an audible frequency range, for one or both ears of the user) is generated, in step 1004. The hearing profile may be generated in the mobile phone based on user feedback, and may be stored in the hearing aid, in the mobile phone, or both.

Then, in step 1006, the hearing profile is transmitted to the server from the hearing aid and/or the mobile phone via the communication network. The server includes a machine learning controller (such as discussed above) arranged to operate machine learning processing model(s) for determining sound processing profile or settings.

In step 1008, the machine learning controller in the server processes the received hearing profile using a (trained) machine learning processing model to determine sound processing profile or settings suitable for the received hearing profile. The machine learning processing model used may be specific to the type, brand, and/or model of hearing aid, information of which may be transferred from the hearing aid and processed by the server to select the appropriate model. The (trained) machine learning processing model have been trained with training data (e.g., input-output pairs), which includes data associated with hearing responses of multiple users, respective one or more properties of environment in which the respective hearing assistance device is located, and respective user input associated with adjustment of sound processing settings of the respective environment.

After the sound processing settings is determined, in step 1010, the settings are transmitted from the server to the hearing aid (directly, or indirectly via the mobile phone). The hearing aid may store the sound processing settings. In step 1012, the hearing aid, in use, uses the sound processing settings received from the server to process sound and to provide the processed sound to the user.

In some implementations, after step 1004, the hearing aid may use the user feedback obtained during the test to set the initial sound processing settings, without going through steps 1006 to 1010.

In step 1014, the hearing aid and/or the mobile phone (in the same environment as the hearing aid) detects change in operation environment of the hearing aid. The change in operation environment may be: a change in location of the environment as detected by a location determination device in the hearing aid (e.g., change in distance from original location above a threshold distance), a change in the sound or ambient noise profile in the environment (e.g., speech/no speech) as detected by the hearing aid based on sound obtained by the microphone of the hearing aid, a change in the "look" of the environment (e.g., crowded/no crowded) as detected by the hearing aid based on an image capture by the camera of the hearing aid, etc.

In step 1016, the hearing aid transmits data of the detected properties or characteristics of associated with the environment in which the hearing aid is located along with the hearing profile of the user, to server. The transmission may be automatic (without requiring user intervention).

In step 1018, the machine learning controller in the server processes the received data (detected properties or characteristics of associated with the environment and hearing profile) using the trained machine learning processing model to determine sound processing profile or settings suitable for the received hearing profile and specific to the environment. The machine learning processing model used may be specific to the type, brand, and/or model of hearing aid, information of which may be transferred from the hearing aid and processed by the server to select the appropriate model. The processing is preferably in real time during operation of the hearing aid in the environment.

After the sound processing settings is determined, in step 1020, the settings are transmitted from the server to the hearing aid (directly, or indirectly via the mobile phone). The hearing aid may store the new sound processing settings. In step 1022, the hearing aid, in use in the environment, uses the sound processing settings received from the server to process sound and to provide the processed sound to the user. In this embodiment, the operation in steps 1014 to 1022 do not require user intervention, i.e., the adjusting of the sound processing settings are automatic based on the change in one or more properties of the environment.

After step 1022, the method may return back to step 1014, in which the change in operation environment is continuously detected during operation of the hearing aid, and when a change is detected, the method repeats steps 1014 to 1022.

Figure 11:
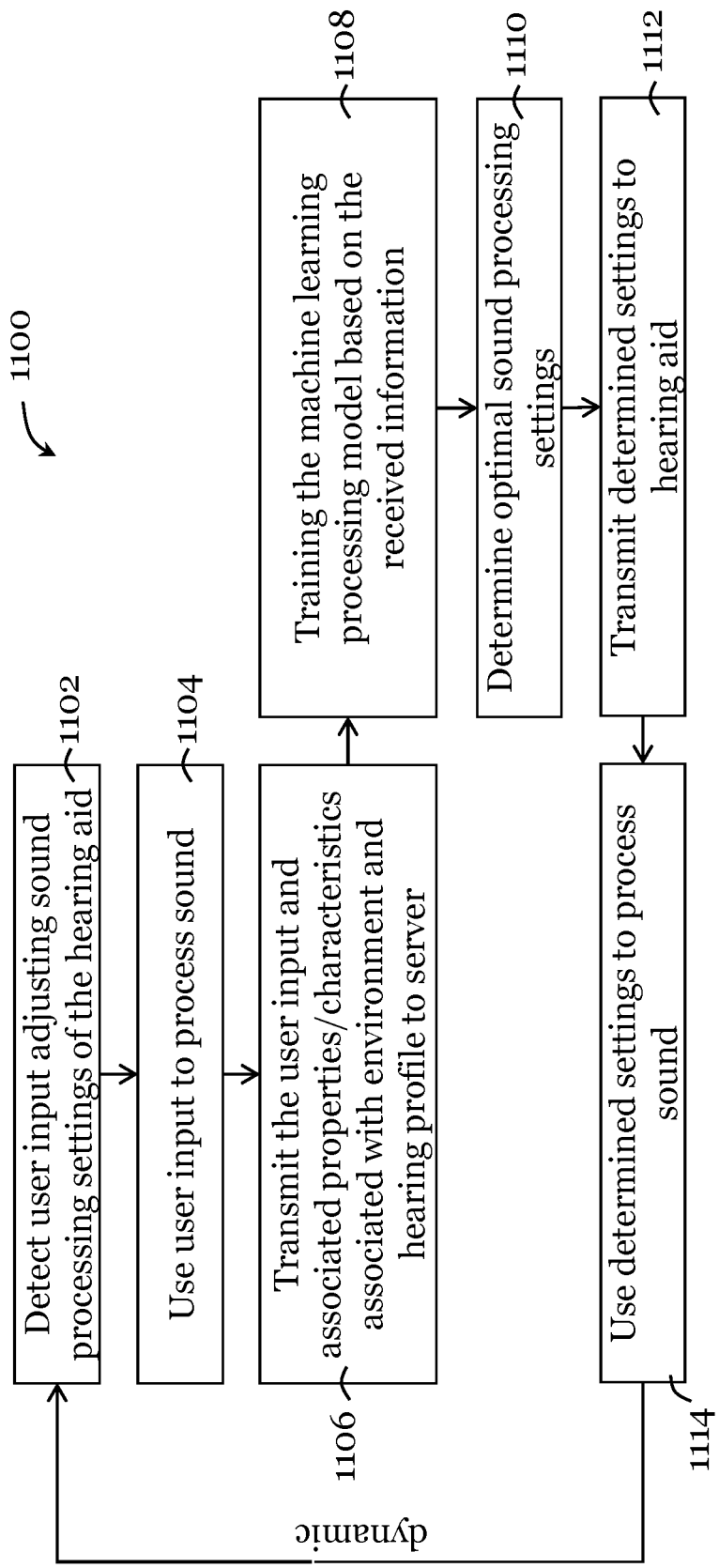
FIG. 11 is a flow diagram of a method for operating a hearing assistance system in one embodiment of the invention.

FIG. 11 shows a method 1100 for operating a hearing assistance system in one embodiment of the invention. The method 1100 may be used in, e.g., the hearing assistance system 100 of FIG. 1.

The method 1100 begins in step 1102, in which during operation of the hearing aid, the hearing aid and/or computing device (e.g., mobile phone) operably connected with the hearing aid receives a user input associated with adjustment of sound processing settings of the hearing aid. The user input may be quantitative, e.g., a user inputted adjustment of the sound (e.g., loudness of particular frequency band(s)), or qualitative, e.g., a user's indication of whether the sound is of acceptable quality. The user input may be received at the input device of the hearing aid and/or of the mobile phone. The receiving of the user input indicates that the user may be experiencing problem or dissatisfaction with hearing of the sound the hearing aid produces.

In step 1104, if the user input is a user inputted adjustment of the sound (e.g., loudness of particular frequency band(s)), the hearing aid uses the user input to process sound at the hearing aid. The original sound processing settings may be overwritten.

In step 1106, the user input, along with associated properties/characteristics associated with environment as detected by the hearing aid in method 1000 and the related hearing profile, are transmitted to the server. If the user input is quantitative such as a user inputted adjustment of the sound (e.g., loudness of particular frequency band(s)), the transmission may be performed only after the user input is received and remain unchanged for a set period of time (which indicates that the user input is actually useful) to prevent unnecessarily frequent transmission. The server includes a machine learning controller (such as discussed above) arranged to operate machine learning processing model(s) for determining sound processing profile or settings. The (trained) machine learning processing model have been trained with training data (e.g., input-output pairs), which includes data associated with hearing responses of multiple users, respective one or more properties of environment in which the respective hearing assistance device is located, and respective user input associated with adjustment of sound processing settings of the respective environment.

In step 1108, the server uses the received information as training data for training the machine learning processing model. In one embodiment, the received information is used as training data for training the machine learning processing model specific to the type, brand, and/or model of hearing aid from which the information is received. The training may be performed whenever the information is received, after a predetermined number or amount of information (from the same or different users) is received, or at determined time intervals. If the user input is a user inputted adjustment of the sound (e.g., loudness of particular frequency band(s)), the sound processing settings as adjusted by the user may be used as output in the input-output pairs of the training data. If the user input is a user is a user's indication of whether the sound is of acceptable quality, the existing sound processing settings associated with the corresponding hearing response and environment, can be disregarded or given less weight in subsequent training of the machine learning processing model.

In step 1110, the server may use the newly trained machine learning processing model to process the data of the properties/characteristics associated with environment and the related hearing profile, to determine new sound processing settings for the hearing aid.

After the new sound processing settings is determined, in step 1112, the settings are transmitted from the server to the hearing aid (directly, or indirectly via the mobile phone). The hearing aid may store the new sound processing settings. In step 1114, the hearing aid, in use in the environment, uses the new sound processing settings received from the server to process sound and to provide the processed sound to the user. In this embodiment, the operation in steps 1104 to 1114 do not require user intervention, i.e., the training of the machine learning processing model for determining sound processing settings and the subsequent implementation of the trained machine learning processing model is automatic After step 1114, the method may return back to step 1102, in which the receiving of user input is continuously detected during operation of the hearing aid, and when a user input is detected, the method repeats steps 1104 to 1114.

The methods 1000, 1100 in FIGS. 10 and 11 can be operated in the same system. The methods 1000, 1100 in FIGS. 10 and 11 can be combined, and optionally operated simultaneously during operation of the hearing aid. One or more steps in the methods 1000, 1100 may be omitted as appropriate, depending on the application.

Figure 12:
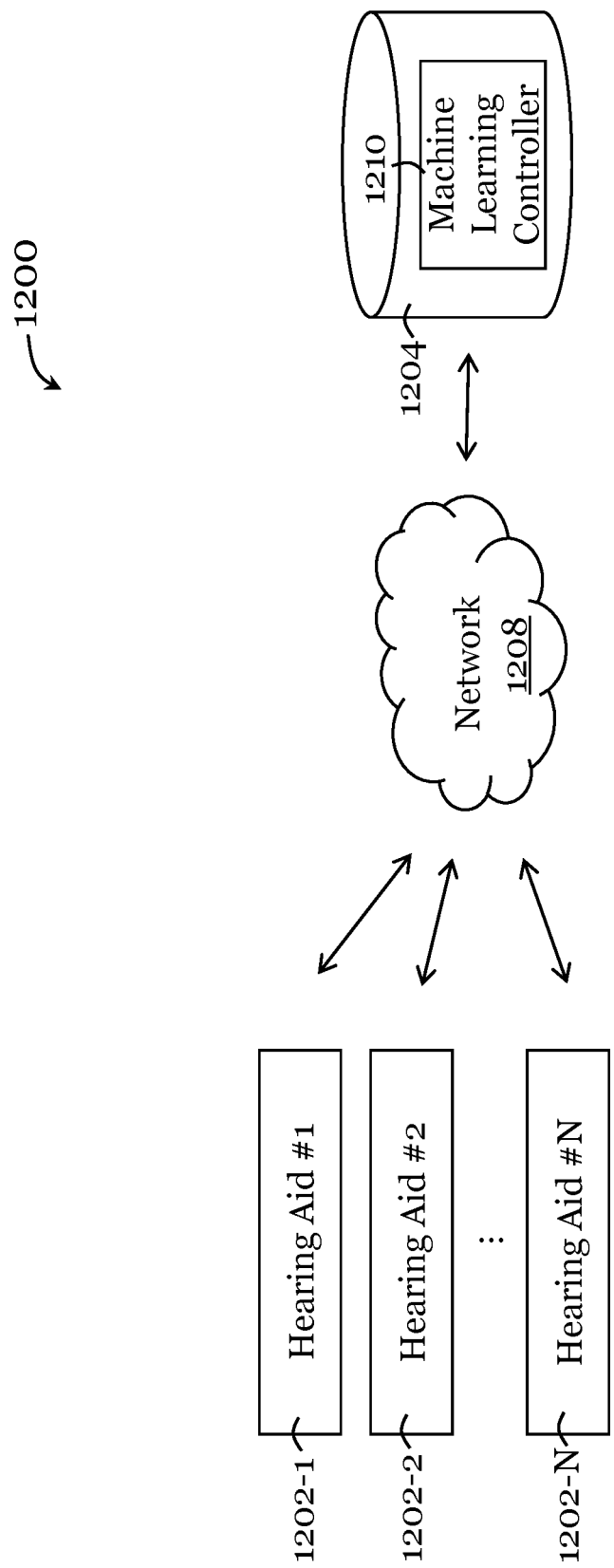
FIG. 12 is a schematic diagram of a hearing assistance system in another embodiment of the invention.

FIG. 12 shows a hearing assistance system 1200 in another embodiment of the invention. In the hearing assistance system 1200, multiple hearing aids 1202-1 to 1202-N are operably connected with the server 1204 that includes a machine learning controller 1210 via a communication network 1208. The hearing aids 1202-1 to 1202-N may be the same or similar to the hearing aid 102 in FIG. 1; the server 1204 and machine learning controller 1210 may be the same or similar to the server 104 and machine learning controller 110 in FIG. 1; the communication network 1208 may be the same or similar to the communication network 108 in FIG. 1. Although not shown, the hearing aids 1202-1 to 1202-N may be associated with a respective computing device (e.g., mobile phone) the same or similar to the computing device 106 in FIG. 1.

In this embodiment, each of the hearing aids 1202-1 to 1202-N are arranged to directly communicate with the server 1204. The server 1204 and machine learning controller 1210 can obtain data from multiple hearing aids 1202-1 to 1202-N of multiple different users in different environment and hence can use the obtained data to train the machine learning processing model(s) in the server 1204. This results in a more rapid training of the machine learning processing model(s), hence a better processing result over time—more useful sound processing settings for different users in different environment using different types/brands/model of hearing aids.

The above embodiments of the invention can provide a hearing aid system with a hearing aid that can adapt its operation to the properties of the environment in which the hearing aid is arranged. The hearing aid, or more generally the hearing aid system, can "learn" from user input and improve its performance over time.

Some above embodiments of the invention can provide, among others, one or more of the following: (1) The user may take a relatively fast and simple self-administered mobile application-based hearing test and use the test result to adjust the hearing aid's initial sound processing settings to match the user's individual hearing profile, or to calibrate the hearing aid's settings over time to take into account the user's change in hearing perception over time. (2) The hearing aid may include built-in capability to "self-learn" and continuously optimize the user's hearing experience out-of-the-box based on the user's environmental context, ambient noise profile (e.g. eating in a restaurant, watching a movie in a movie theatre, watching an outdoor concert or football match, watching TV at home, talking one-on-one in a quiet place etc.) and preferences. (3) Information on the environmental context, including noise, images, GPS location, etc. of the environment, and user's input preferences (which are input through the hearing aid or the mobile phone) may be sent to the server (cloud computing server) in real time during operation for training the machine learning processing models (e.g., neural networks). The machine learning processing models may thus improve over time. (4) The hearing aid may automatically recognize the user's environment context and the machine learning processing model may automatically set the hearing aids settings and preferences to optimize the user's hearing experience, with little or no user input required. (5) The accumulated data of a large number of users over time will be continuously used to train or optimize machine learning processing models (e.g., neural networks) to determine and set the initial settings of the hearing aid more accurately after users complete the hearing test administered through the mobile application.

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

It will be appreciated by persons skilled in the art that numerous variations and/or modifications may be made to the invention as shown in the specific embodiments to provide other embodiments of the invention. One or more features disclosed in one embodiment or aspect may be combined with one or more features disclosed in another embodiment or aspect. For example, the hearing assistance systems 100, 1200 may incorporate one or more or all of the information handling system of FIG. 2, the machine learning controller of FIG. 3, the hearing aid of FIG. 4, and/or may implement the method in one or more or all of FIGS. 5-8, 10 and 11. The described embodiments of the invention should therefore be considered in all respects as illustrative, not restrictive.

For example, while the machine learning controller in the illustrated embodiment(s) is shown to be arranged at the server, it should be appreciated that the machine learning controller can be arranged at the hearing assistance device, at the computing device, or that the machine learning controller can be arranged distributively at two or more of the server, the computing device, and the hearing assistance device. The machine learning controller may be formed by any number (non-zero) of processors and any number (non-zero) of memory. In some examples, the hearing assistance device may be arranged to include sufficient computing power (e.g., via edge computing technologies) to perform part of, or entirely, the processing operations of the external device. The features of the invention disclosed may be applied to other non-medical hearing devices such as entertainment speakers, earphones, etc. The hearing assistance system may include any number of hearing aid, computing device (e.g., mobile computing device), and server. The hearing assistance system may include only the hearing aid and the server, only the hearing aid and the computing device, or only the hearing aid (e.g., integrated with the computing device). The one or more properties associated with the environment in which the hearing aid is located may be additionally or alternatively obtained or determined by the computing device, provided that the computing device is arranged at the same or substantially the same location as the hearing aid. For example, the location determination or the image capturing can be performed by the computing device using the corresponding hardware. The user input or adjustment may be received at the hearing aid additionally or alternatively. The user input may be a tactile input (e.g., received via button, touch-screen, etc., of the hearing aid and/or the computing device) or an audio input (e.g., voice commands received via microphone).

The invention claimed is:

1. A hearing assistance device comprising:
a microphone arranged to receive sound of an environment in which the hearing assistance device is located;
a wireless communication device arranged to wirelessly communicate data with an external device;
a memory storing a trained machine learning processing model;
a controller operably connected with the microphone and arranged to process the received sound using sound processing settings that have been determined at the controller using the trained machine learning processing model; and
a speaker operably connected with the controller and arranged to output the processed sound; wherein the sound processing settings have been determined using the trained machine learning processing model based on a hearing response of a user and one or more properties of the environment.

2. The hearing assistance device of claim 1, wherein the one or more properties of the environment comprises: sound profile or ambient noise profile of the environment received by the microphone.

3. The hearing assistance device of claim 1, wherein the memory further stores the sound processing settings.

4. The hearing assistance device of claim 1, further comprising: a location determination device arranged to determine a location of the environment in which the hearing assistance device is located.

5. The hearing assistance device of claim 4, wherein the location determination device comprises a Global Positioning System (GPS) unit.

6. The hearing assistance device of claim 4, wherein the one or more properties of the environment comprises: the determined location of the environment.

7. The hearing assistance device of claim 1, further comprising: a camera arranged to capture an image of the environment; and wherein the controller is arranged to process the image to determine one or more properties of the environment for use in determining the sound processing settings.

8. The hearing assistance device of claim 1, wherein the wireless communication device comprises at least one of: a Bluetooth communication module, a cellular communication module, a LTE-M communication module, and a NB-IoT communication module.

9. The hearing assistance device of claim 1, wherein the hearing assistance device comprises an input device arranged to receive user input associated with adjustment of sound processing settings of the environment.

10. The hearing assistance device of claim 1, wherein the microphone comprises a multi-directional microphone or an omnidirectional microphone.

11. The hearing assistance device of claim 1, wherein the sound processing settings are determined or updated dynamically based on change in the one or more properties of the environment.

12. The hearing assistance device of claim 1, wherein the trained machine learning processing model includes an artificial neural network.

13. A server for facilitating operation of a hearing assistance device of a user, the server comprising:
a controller arranged to:
receive data associated with multiple users and their respective hearing assistance device, the data including a hearing response of the respective user, one or more properties of respective environment in which the respective hearing assistance device is located, and respective user input associated with adjustment of sound processing settings of the environment; and
train a machine learning training model using the received data from the multiple users to obtain a trained machine learning training model, the trained machine learning training model being arranged to determine sound processing settings for use in the hearing assistance device of the user.

14. The server of claim 13, wherein the one or more properties of the respective environment in which the respective hearing assistance device is located comprises one or more of:

sound profile or ambient noise profile of the environment;
location of the environment; and
a characteristic in an image of the environment.

15. The server of claim 13, wherein the controller is further arranged to:
process a hearing response of the user using the trained machine learning training model so as to determine sound processing settings for use by the hearing assistance device of the user.

16. The server of claim 13, wherein the controller is further arranged to:
process a hearing response of the user and one or more properties of environment in which the hearing assistance device of the user is located using the trained machine learning training model so as to determine sound processing settings for use by the hearing assistance device of the user at the environment.

17. A method for facilitating operation of a hearing assistance device of a user, comprising:
receiving, at a server, data associated with multiple users and their respective hearing assistance device, the data including a hearing response of the respective user, one or more properties of environment in which the respective hearing assistance device is located, and respective user input associated with adjustment of sound processing settings of the environment; and
training, at the server, a machine learning training model using the received data to obtain a trained machine learning training model.

18. The method of claim 17, wherein the server is a cloud computing server.

19. The method of claim 17, further comprising:
receiving the respective user input at respective mobile computing device, and
transmitting the respective user input from the respective mobile computing device to the server.

20. The method of claim 17, further comprising:
detecting the respective one or more properties of the respective environment at the respective hearing assistance device; and
transmitting the respective one or more properties of the respective environment from the respective hearing assistance device to the server.

21. The method of claim 17, further comprising processing, at the server, a hearing response of the user using the trained machine learning training model so as to determine sound processing settings for the hearing assistance device of the user.

22. The method of claim 21, further comprising transmitting the determined sound processing settings to the hearing assistance device of the user so that the hearing assistance device of the user can process sound using the determined sound processing settings.

23. The method of claim 17, further comprising processing, at the server, a hearing response of the user and one or more properties of an environment in which the hearing assistance device of the user is located using the trained machine learning training model so as to determine sound processing settings for use by the hearing assistance device of the user at the environment.

24. The method of claim 23, further comprising transmitting the determined sound processing settings to the hearing assistance device of the user so that the hearing assistance device of the user can process sound using the determined sound processing settings.

25. The hearing assistance device of claim 1,
further comprising: a camera arranged to capture an image of the environment for determining crowdedness of the environment; and
wherein the one or more properties of the environment comprises:
sound profile or ambient noise profile of the environment, and
crowdedness of the environment.

26. The hearing assistance device of claim 1,
further comprising:
a camera arranged to capture an image of the environment for determining crowdedness of the environment, and
a location determination device arranged to determine a location of the environment in which the hearing assistance device is located; and
wherein the one or more properties of the environment comprises:
sound profile or ambient noise profile of the environment,
location of the environment, and
crowdedness of the environment.

27. The hearing assistance device of claim 26, wherein the location determination device comprises a Global Positioning System (GPS) unit.

28. The hearing assistance device of claim 1, wherein the trained machine learning processing model is specific to a type, brand, and/or model of the hearing assistance device.

29. The hearing assistance device of claim 1, wherein the controller is further arranged to receive data associated with a hearing response of the user, one or more properties of an environment in which the hearing assistance device is located, and a user input associated with adjustment of sound processing settings of the environment; and
train a machine learning training model using the received data to obtain the trained machine learning training model.

30. The server of claim 13, wherein the one or more properties of the environment in which the respective hearing assistance device is located comprises one or more of: a sound profile or ambient noise profile of the environment, location of the environment, and crowdedness of the environment.

31. The server of claim 13,
wherein the hearing assistance devices of the multiple users are of the same type, brand, and/or model, and
wherein the trained machine learning processing model is specific to a type, brand, and/or model of the hearing assistance device of the user.

32. A hearing assistance device comprising:
a microphone arranged to receive sound of an environment in which the hearing assistance device is located;
a wireless communication device arranged to wirelessly communicate data with an external device;
a camera arranged to capture an image of the environment;
a controller operably connected with the microphone and arranged to
process the image to determine crowdedness of the environment for use in determining sound processing settings, and
process the received sound using the sound processing settings that have been determined using a trained machine learning processing model, and
a speaker operably connected with the controller and arranged to output the processed sound; wherein the sound processing settings have been determined using the trained machine learning processing model based on, at least, a hearing response of a user, the determined crowdedness of the environment, and a sound profile or ambient noise profile of the environment.

33. The hearing assistance device of claim 32, further comprising: a location determination device arranged to determine a location of the environment in which the hearing assistance device is located, wherein the sound processing settings have been determined using the trained machine learning processing model based further on the location of the environment.

34. The hearing assistance device of claim 33, wherein the location determination device comprises a Global Positioning System (GPS) unit.

* * * * *